United States Patent [19]

Froessl

[11] Patent Number: 5,396,588
[45] Date of Patent: Mar. 7, 1995

[54] DATA PROCESSING USING DIGITIZED IMAGES

[76] Inventor: Horst Froessl, Gutenbergstrasse 2-4, 6944 Hemsbach, Germany

[21] Appl. No.: 547,190

[22] Filed: Jul. 3, 1990

[51] Int. Cl.[6] .......................................... G06F 15/62
[52] U.S. Cl. ............................ 395/145; 395/150; 382/69; 364/419.19; 364/DIG. 2; 364/963
[58] Field of Search ............... 395/145, 150, 600; 382/11, 48, 69; 364/419, 963, 419.19

[56] References Cited

U.S. PATENT DOCUMENTS

| | | | |
|---|---|---|---|
| 3,634,822 | 1/1972 | Chappaq | 382/69 |
| 3,964,591 | 6/1976 | Hill et al. | 197/1 R |
| 4,028,674 | 6/1977 | Chuang | 340/146.3 |
| 4,273,440 | 6/1981 | Froessl | 355/40 |
| 4,553,261 | 11/1985 | Froessl | 382/57 |
| 4,594,674 | 6/1986 | Boulia et al. | 395/145 |
| 4,672,683 | 6/1987 | Matsueda | 382/57 |
| 4,726,065 | 2/1988 | Froessl | 381/41 |
| 4,748,678 | 5/1988 | Takeda et al. | 382/56 |
| 4,758,980 | 7/1988 | Tsunekawa et al. | 364/900 |
| 4,760,606 | 7/1988 | Lesnick et al. | 382/48 |
| 4,887,304 | 12/1989 | Terzian | 382/30 |
| 4,907,283 | 3/1990 | Tanaka et al. | 382/40 |
| 4,933,979 | 6/1990 | Suzuki et al. | 382/61 |
| 4,944,022 | 7/1990 | Yasujima et al. | 382/14 |
| 4,985,863 | 1/1991 | Fujisawa et al. | 364/900 |
| 4,989,042 | 1/1991 | Muramatsu et al. | 355/244 |
| 5,038,392 | 8/1991 | Morris et al. | 382/61 |
| 5,048,113 | 9/1991 | Yamagata et al. | 382/57 |
| 5,051,925 | 9/1991 | Kadono et al. | 364/519 |
| 5,060,146 | 10/1991 | Chang et al. | 364/900 |
| 5,109,439 | 4/1992 | Froessl | 382/61 |

Primary Examiner—Mark K. Zimmerman
Assistant Examiner—Joseph Feild
Attorney, Agent, or Firm—Walter C. Farley

[57] ABSTRACT

A method of manipulating information is disclosed in which the data is stored as a digitized image and is retained in image form for various data processing manipulations. A font table is formed having a matrix of fonts correlated with characters and symbols in code form such as ASCII. Desired material in the stored documents is located using pattern-match searching with a parallel processor search engine.

8 Claims, 4 Drawing Sheets

FIG. 1

FONT TABLE

| FONTS → | 1 | 2 | 3 |
|---|---|---|---|
| CHARACTERS | | | |
| A | A | A | *A* |
| B | B | B | *B* |
| C | C | C | *C* |
| --- | --- | --- | --- |
| a | a | a | *a* |
| b | b | b | *b* |
| c | c | c | *c* |
| --- | --- | --- | --- |
| 1 | 1 | 1 | *1* |
| 2 | 2 | 2 | *2* |
| 3 | 3 | 3 | *3* |
| --- | --- | --- | --- |
| ! | ! | ! | *!* |
| $ | $ | $ | *$* |
| --- | --- | --- | --- |

DATA PROCESSING USING DIGITIZED IMAGES

CROSS REFERENCE TO RELATED APPLICATION

Reference is made to application Ser. No. 536,769, filed Jun. 12, 1990, the entire content of which is hereby incorporated by reference.

SPECIFICATION

This invention relates to a method and apparatus for using image searching and manipulation techniques to store and retrieve information in such a way that the input of material from documents to mass storage is facilitated and the retrieval of desired information is not impeded.

BACKGROUND OF THE INVENTION

Mass storage is becoming a much more interesting tool than it has in the past for a larger number of applications because of the introduction of relatively new mass storage media such as optical disks. However, it is still necessary to find efficient ways of putting the data into mass storage and retrieving it.

Certainly the most efficient technique for inputting the contents of typed or printed documentation is with the use of optical scanning techniques. Methods and apparatus for handling incoming mail and the like in large quantities are disclosed in my copending application Ser. No. 536,769. In that application, the technique is used of optically scanning each document, identifying by data processing techniques "search words" which can subsequently be used to retrieve the documents and then storing the documents in a mass store, either in image form or in a data processing code such as ASCII. By "image form" it is meant that a digitized representation of the image of the document is stored in a form which is sometimes referred to as "bit mapped". While image storage requires much more memory, it has the advantage of speed over converting everything into dp code, which necessarily requires human editing to assure accuracy of conversion, and also has the advantage of being able to reproduce a replica of the original on a display or with a suitable printer, including signatures, letterhead "logos" and other non-text or unconvertible features such as drawings or graphics.

Retrieval has always been regarded as a requirement which necessitated conversion into dp code of all or a significant part of each document. Even in the system disclosed in Ser. No. 536,769, some conversion is used in connection with search words and the like, and that system is regarded as representing a minimum of conversion, and probably the most efficient system for bridging the gap between hard copy (paper) and mass electronic or optical storage. It would, however, be advantageous for many circumstances if the speed of putting information from documents into digital storage could be further increased so that the time for putting a page of printed or typed material into digital form in mass storage could be, in essence, not significantly longer than the time required for the page to be physically scanned by an optical scanning device.

SUMMARY OF THE INVENTION

An object of the present invention is to provide a method of retrievably storing contents of documents rapidly using the full content of the document as search criteria for both text and graphics.

A further object is to provide such a method wherein document contents can be manipulated and processed without converting the alphanumeric characters in the document into code.

Yet another object is to provide a system which includes a method of retrieving image content by pattern matching, with or without indexing.

A further object is to provide a system which can convert existing paper documents, such as technical manuals, into a form suitable for interactive electronic display.

Briefly described, the invention comprises a method of data processing including storing digitized images of document contents, establishing in non-volatile memory a font table including code values of alphanumeric characters and symbols and images of characters and symbols in each font used in the documents, each of the characters and symbols in each font being correlated with the code values for the character or symbol, locating digitized images of selected portions of stored documents which are to be manipulated, and manipulating the selected portions in the form of digitized images.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form part of this specification, and wherein:

FIG. 1 is a schematic illustration of a font table showing the organization of a matrix usable to construct a correlation between characters and their equivalents in a plurality of fonts;

DESCRIPTION OF THE PREFERRED EMBODIMENTS

Figure 2:
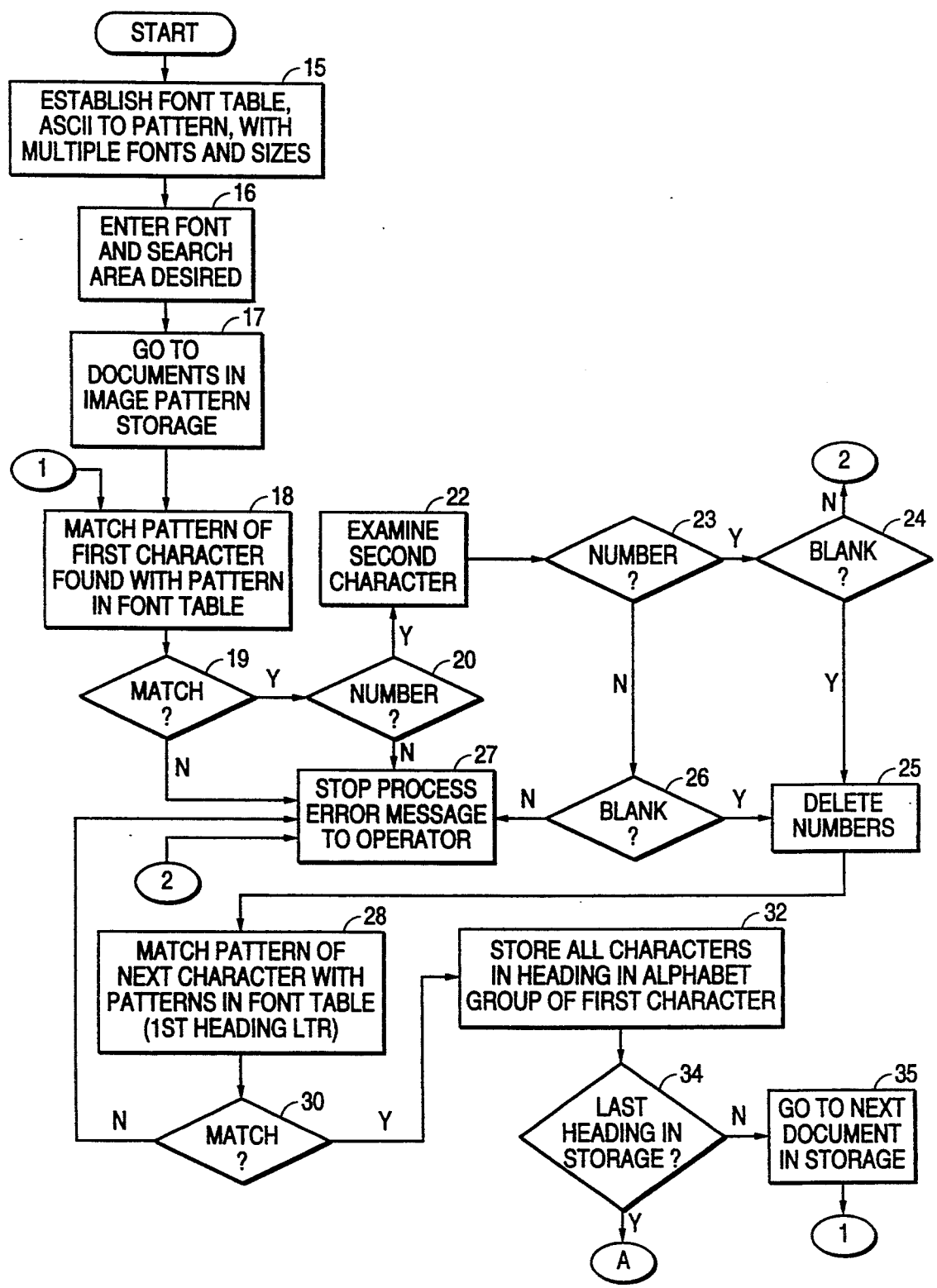
FIGS. 2 and 3 are parts of a flow diagram illustrating the steps of the method of the invention as applied to a specific storage and retrieval problem.

In most storage systems which deal with large amounts of data, the data is converted into dp code, ASCII being the most common, and stored in code form. When one wishes to retrieve some part of the stored data, various techniques can be used, depending on how the system is designed to operate. Some use index techniques while others rely on full-text searching for selected search words.

In accordance with the present invention, information is stored in image form, the word "information" being used to mean the content of documents which are being or have been transferred from a typed, printed or written form to digital storage. The stored information is preferably not indexed as it is entered into the system because any indexing system adds time to the input process.

While it would theoretically have been possible in prior art systems using image storage to conduct a pattern search to locate a specific word "match" in the stored images of a large number of documents, success would not have been likely unless the "searched for" word were presented in a font or typeface very similar to that used in the original document. Since such systems have had no way of identifying which font might have been used in the original document, a pattern search has had a low probability of success and could not be relied upon.

In order to overcome this problem, the present invention uses what will be referred to as a "font table". The font table is a matrix of patterns organized in such a way that the alphanumeric characters and other symbols in a specific style of font or typeface are correlated with the ASCII (or other code system) values for those symbols. A schematic representation of a font table is shown in FIG. 1. When represented on paper, the table has a plurality of columns 10a, 10b, 10c, . . . and a plurality of rows 12a, 12b, 12c, . . . . Each column contains a list of the various patterns of characters which go to make up a font set, each character being in the particular style of that font. Each row contains various forms of each character or symbol in each of the various fonts. At the intersection of a row and column will be found a specific character pattern in a selected font. The fonts can be identified in any convenient way, such as by numbers, and the characters can also be identified in various ways although one of the most desirable is to use the ASCII value for each character.

The present invention does not use a font table imprinted on paper but, rather, uses a table in the form of a non-volatile memory such as a hard disk, i.e., a memory medium which is not erased when power is removed. As such, it may not physically have columns and rows, but can have any convenient equivalent form of organization which has characteristics similar to the written form, i.e., a font set can be located and recognized, the members of a set of fonts representing any single character can be recognized and the "intersection" patterns can be quickly located, e.g., the pattern which represents the letter "H" in font number 3 can be located in the memory.

The form of memory used is preferably revisable, i.e., additions of new fonts can be made and corrections can also be made. If this is considered unimportant for a specific application, the table can be stored in some form of read-only-memory (ROM) such as in one or more PROM chips.

As mentioned above, each member of each font set is stored in the table as an image. Thus, when one wishes to locate a specific word, printed in a specific font, in the mass store which contains all of the document text, the word is entered in code form as by keyboard and the character pattern equivalent to each letter of the word is copied from the font table into volatile memory (RAM) in the selected font. A pattern search is then conducted to find a string of patterns in the stored text which matches the string of patterns which has been constructed from the table. The system can require a full match but, more practically, a match of some accuracy less than 100% is used in order to be reasonably sure of finding the desired word and avoid the problem of missing the word because of a typographical error or a small defect in the stored image.

A pattern search of the type described can be performed very quickly using a very fast computer search engine such as that developed and marketed by the Benson Computer Research Corporation, McLean, Va. The Benson systems employ multiple processors in a parallel architecture arrangement to conduct comparisons at a high rate of speed. Once located, the words or the documents which contain the word images can be copied into RAM or disk for sorting or other manipulation. Alternatively, the contents of storage such as optical disk (WORM) can be copied to RAM for pattern match searching.

It is also possible to automatically provide a string of all fonts for each search word entered by a user for an individual search. However, for the most efficient searching, as suggested above, it is desirable to be able to specify the font or fonts in which the searched-for text appears. This may not always be possible, but with proper system arrangement it is possible in a large number of situations. When dealing with incoming correspondence, as in the system of application Ser. No. 536,769, it is quite helpful to also maintain a record of fonts used by a specific company and to add new fonts, when they are encountered, with the identification of the sender.

Consider, for example, the situation in which the mass store is dealing with correspondence and the Volkswagen Company is known to have used 5 specific fonts and further assume that retrieval of a document received from the Volkswagen Company containing the term "rear axle" is needed. It is known that the letter was sent by a Mr. Wagner in May, 1989. The operator enters as search criteria the search words "rear axle, Wagner, May 1989" and "Volkswagen=company". The program goes to a company list and, under "Volkswagen" identifies those fonts associated with Volkswagen in image and select the search words "rear axle, Wagner, May 1989" in 5 different image fonts since the letter might have been written in any one of those. The search engine, in a relatively short time searches the image files and extracts the desired letter, or possibly several letters meeting the criteria, ready for display and/or printout. This approach permits adding even old, outdated fonts for filing old documents, eliminating the requirement of warehouses stacked with old files.

It is a relatively simple matter to maintain the font record. In received correspondence, the font (or fonts) used in a newly received letter is compared with the font table and, if the font is recognized as being in the table, the font is listed with the name of the sender. If a font is not recognized, the document image can be flagged to bring it to the attention of an operator for addition to the table, generally a partly manual process.

As a more detailed and specific illustration of the method of the present invention, consider the case of a naval organization which has a large number of handbooks and instruction manuals all of which are needed for the routine maintenance of a ship. These manuals, or their equivalents, must be carried by the ship so that the personnel in various specialties can refer to them for routine maintenance, or non-routine repair, of any system aboard, whether of a mechanical, hydraulic, electrical or other nature. Such manuals are typically printed in a small number of type styles or fonts which are relatively standard. The presence of a full set of such manuals for an aircraft carrier has been estimated to be responsible for altering the draft of the ship by about three feet.

In accordance with the present invention, all of the manuals with their associated diagrams and illustrations can be stored in image form on a reasonable number of optical disks and can then be searched to locate the information of interest. Because of the limited number of fonts which are known in advance, the search speed is maximized and the weight associated with the printed documents is replaced by the comparatively trivial weight of several computers (which are already available on the ship in the form of personal computers)

along with the optical disks and disk readers for cooperating with the computers.

Referring now to FIG. 2, the following example will involve the review, by the computer equipment, of the stored text of the manuals for the purpose of extracting (copying into RAM) the chapter headings of all chapters, and then putting them into alphabetical order. Although each chapter heading is preceded by a one- or two-digit reference number, for the present purpose those numbers are to be discarded and only the chapter names are to be retained. As indicated above, three fonts are used in the manuals, a large font for chapter headings, a medium font for subheadings and a "normal" font for the text. The first step 15 in the method thus is the establishment of a font table which cross-references the ASCII values for each letter, number and other symbol to the equivalent characters in the fonts used. For this example, only the largest font would be needed, but the table is established with all fonts when the mass storage files are created so that any manipulation can be done.

The identification of the font which is to be searched for is then entered, 16, along with the search area desired, i.e., any limitation on the area of the manuals which are to be searched. The search engine, such as the Benson system mentioned above, then examines the full text of the documents in image storage, 17, and attempts to match the pattern of the first character of each heading with the pattern in the table, 18. If there is a match, the character is examined, 20, to see if it is a number. If it is a number, the heading is further examined, 22, to see if the second character is a number or a blank space, 23. If the second character is found to be a number, there is a check to see if there is a blank space, 24, following the second number. Location of a blank in either place completes the pattern which identifies a heading. Thus, in addition to the font size, the material being examined has been confirmed as a heading and the numbers preceding the heading name have been isolated. Those numbers, having served their purpose for this search, are deleted, 25. Failure to find a match in the appropriate font size or a blank in the proper place, 26, is inconsistent with the known format of the stored documents. In such a case, the process is stopped and the operator is informed with an appropriate error message, 27.

The following character is compared, 28, with the font table to determine which letter of the alphabet begins the first word of the heading. If there is no match, 30, then the method is stopped and the operator is informed, 27. If there is a match, all of the words in the heading are then copied and stored together, 32, as being a heading and they are stored in an alphabet group which will contain other headings starting with the same letter, i.e., if the heading is "HYDRAULIC SYSTEMS", then it is stored in a memory area reserved for headings starting with H. The first letter of the stored heading will now be referred to as the "first character".

Figure 3:
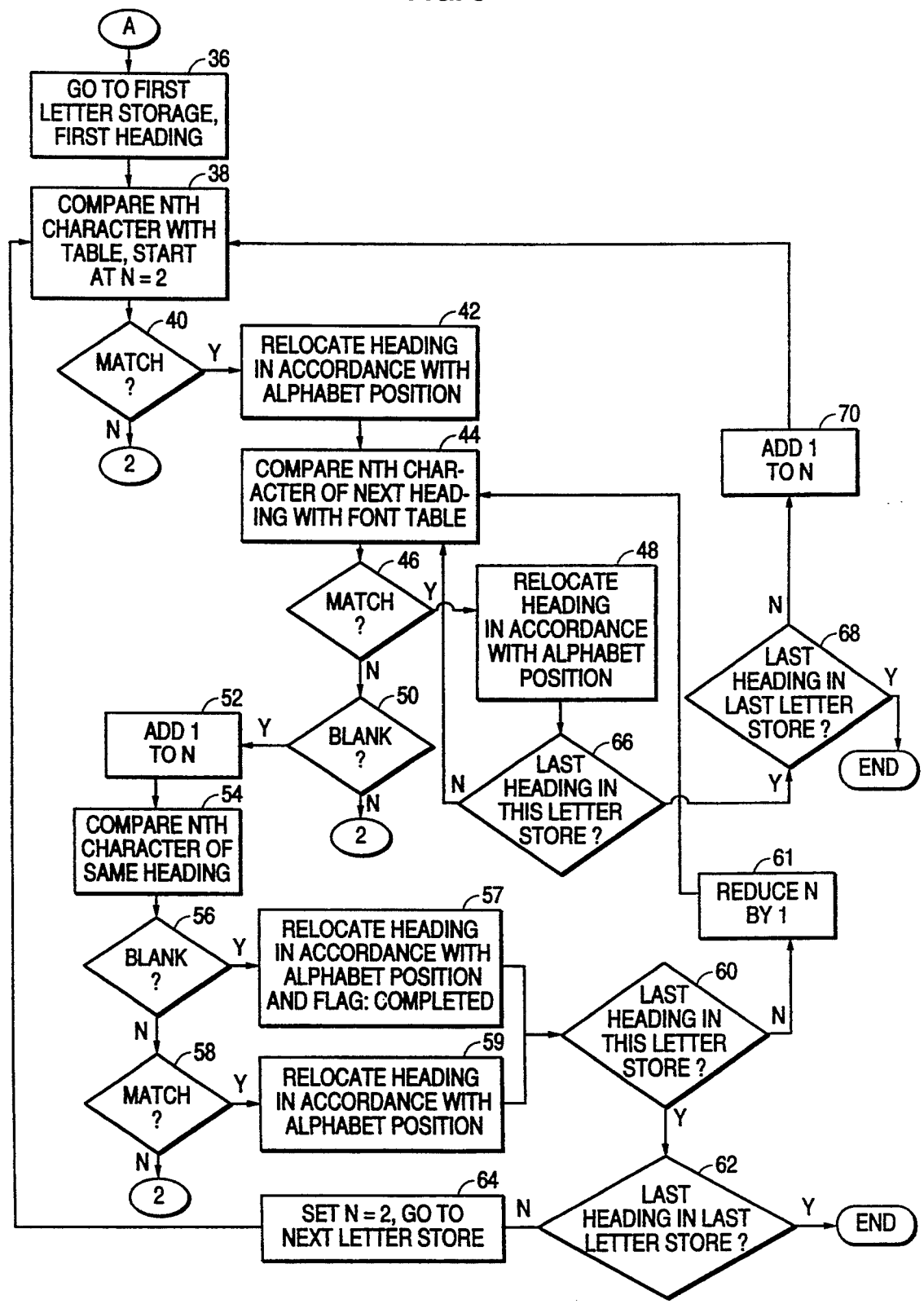

The mass store is then examined to see if there is another document with a heading in storage, 34. If so, 35, the above steps beginning at 18 are repeated for each as indicated by the circled recirculation numeral 1. If the heading is found to be the last heading in the last document, then the process of arranging the documents within the alphabet groups begins as shown in FIG. 3. Actually, the rearranging process can be accomplished while the above steps are being repeated for the second and subsequent documents, but for simplicity, it is described herein as being a totally serial process.

The rearranging process begins, 36, with the first alphabet group in which the next, or Nth, character of each heading is examined, 38, for a match with a pattern in the font table. For this next character, N=2. If a match, 40, is found, the heading is relocated, 42, to a position in the memory consistent with that second letter position in the alphabet. The Nth character of the next heading is examined, 44, and if a match is found, 46, that heading is also relocated, 48. If no match is found, the character is checked, 50, to see if it is a blank. If it is not a blank, the process is stopped and an error message given, 27. If it is a blank, then N is increased by one, 52, and the next character of that same heading is checked, 54. If that also is a blank, 56, it is assumed that the heading has ended and the heading is relocated, 57. In addition, that heading is flagged as having been completed insofar as alphabetizing is concerned and it is passed by in subsequent operations. If it is not a blank, a match is sought, 58. A failure to find a match stops the process. If there is a match, then it means only that there was a space in the heading and it is relocated, 59. After either relocation 57 or 59, a check is made, 60, to see if this was the last heading in this first letter store. If not, N is reduced by one, 61, and the process continues from 44. If so, a check is made, 62, to see if this is the last heading in the last first letter store. If so, the entire alphabetizing process is ended. If not, N is reset to two, 64, and the process is continued with the next first letter store from 38.

Returning to step 48, after relocation, the process checks to see if that was the last heading, 66. If not, the process is recirculated to 44. If so, a check, 68, is made to see if this was the last heading in the last letter store. If so, the process has been completed and the headings are ready to be printed out or displayed in the desired order. If not, N is increased by one, 70, and the process repeats from 38.

In the above process, it will be apparent that instead of being relocated each time the next character is identified, an index can be built up to identify the storage locations of words having certain character values. Then, when a printout or display is desired, the images are read out on the basis of the index information.

In the approach described above, the text is stored totally in image form, i.e., without conversion to ASCII or other code. In a modified version of that approach, special use can be made of the printed index which generally accompanies documents such as this to facilitate searching for and displaying desired portions of text or illustrations. In this modified approach, the printed index (as distinguished from any index created by the computer system) is not only stored in image but is also converted into code, using conventional character recognition equipment and software, either when the material is first scanned into mass storage or subsequently. Then, when one wishes to locate those parts of the stored text relating to a specific index item, the index is displayed from the stored code, the desired item is selected from the display and image search words are constructed from the font table in each of the fonts used in the document. Those image search words are then used in a pattern search, as discussed above, to locate the relevant parts of the text. The image store of the index need not be maintained after conversion. This approach retains the advantages of image storage for most of the material but facilitates retrieval by providing a more direct technique for finding relevant search words and constructing images from them for a pattern search. The conversion and editing time is minimized because the index is generally rather small (in terms of the number of characters) as compared with the entire document.

Generally speaking, the selection of search words is a topic which is discussed in detail in copending application Ser. No. 536,769, mentioned above. In documents not having a printed index of any kind, such as correspondence, search words are preferably selected in some fashion when the material is stored, or at least before it is expected to be used. Computer generated search word indexes can be created, as described in that application. It is important for the users of the system to be able to add and delete search words when that appears desirable. Assume the situation in which an important letter is received and reviewed by the individual addressee. As he or she takes action regarding the letter, it may appear that one or more specific words of the letter are very important. The addressee calls up a display of the search words for that letter, adds the newly-recognized important words if they are not already present in the search word list, and perhaps deletes others which appear to be of less importance. By this technique, for only those documents which are likely to be most significant, the search word list is refined and improved. Documents of less importance thus, appropriately, receive less individual attention.

A combination of the individual search word approach and the non-indexed pattern match search can be used. In a German-language oriented system, it is possible to conduct a pattern search of a capitalized word (a noun in German) with a modifying uncapitalized word to locate a particular letter in a situation in which a person happens to recall that a desired letter contained that specific combination of words. This would be somewhat more efficient than finding and reviewing all of the letters containing the capitalized word, even though that capitalized word might have been converted as a search word.

Using the techniques of Ser. No. 536,769, search words are identified and, in accordance with the present invention, the images of those search words can be stored in a separate search word table or index. That table can be displayed and words selected therefrom for search purposes. Pattern match searching from this table has a very high probability of success, without reference to the font table, because the search is beginning with an image derived directly from the document being searched for.

Figure 4:
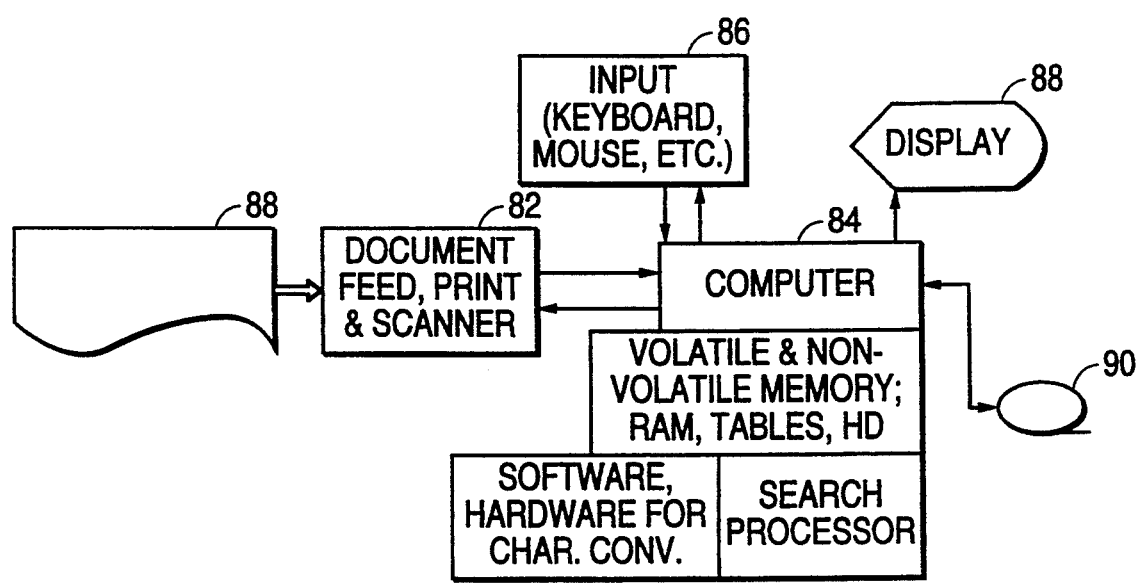
FIG. 4 is a schematic diagram of a system for performing the method.

FIG. 4 shows a rather simplified diagram of a system in accordance with the present invention. It will be recognized by those skilled in the art from the above description that the most important aspects of the present invention reside in the software and the system configuration rather than in hardware since each piece of hardware is individually available and is capable of performing the necessary steps of the method without modification. However, in order to be sure that the actual configuration is clear, a system usable to perform the method is shown in block form in FIG. 4.

Documents 80 are typically delivered to a scanner 82 which can have a document feeder if the documents are being supplied in individual sheet form. Scanner 82 provides the scan data to a computer 84 which is the "heart" of the system in the sense of controlling the sequence of events and the communication between various components. As such, it is provided with volatile and non-volatile memory of adequate capacity to allow the necessary processing, hold the programs and store the font table which is used in connection with the present invention. In addition, the computer 84 has, either as an integral part or as a cooperating processor which could be a separate computer, the necessary hardware and software for character conversion as well as a search engine such as the Benson parallel processor mentioned above which also can be an integral part of the computer. The computer also has the customary keyboard or other input device 86 and a display 88.

Computer 84 is provided with a bidirectional communication bus for data transfer to and from mass storage equipment 90, such as a "juke box" CD-ROM drive for data retrieval which may be part of, or in addition to, apparatus for storing newly processed data on the mass storage media.

While certain advantageous embodiments have been chosen to illustrate the invention, it will be understood by those skilled in the art that various modifications can be made therein without departing from the scope of the invention as defined by the appended claims.

What is claimed is:

1. A method of data processing comprising
storing digitized images of document contents including text in at least one font,
establishing in non-volatile memory a font table including code values of alphanumeric characters and symbols and images of characters and symbols in each font used in the document text, each character and symbol in each font being correlated with the code value for the character or symbol,
selecting and locating digitized images of selected portions of stored documents to be manipulated by data processing, the step of locating including
defining a search word which appears in the stored documents,
entering code representing the search word,
compiling from the font table a plurality of image words constructed of a sequence of images of characters which are the same characters as the search word and in image in a plurality of fonts,
comparing the image words with the stored digitized images until a match is found, and
copying into a memory the stored image of the document in which the match is found; and
processing the selected digitized images.

2. A method according to claim 1 wherein the step of selecting includes
selecting a plurality of words from the stored text and copying stored images of the selected words into a temporary store,
sequentially evaluating alphabetical positions of images of successive characters in each of the plurality of words, and
arranging the images of the words in alphabetical order correlated with the alphabetical positions of the successive character images.

3. A method according to claim 2 wherein the stored image copies are in at least two different fonts.

4. A method according to claim 1 wherein the document has a plurality of lines of imprinted characters in a font and the step of storing includes
digitizing successive lines of imprinted characters in a document to form digitized images of the document contents, comparing selected characters of the digitized images with the font table to determine whether a match exists between an existing font in the table and a font in which the document is imprinted, and, when no match is found to exist, adding images of the selected characters to the font table correlated with the code values of those characters.

5. A method according to claim 4 and including correlating fonts used in documents emanating from a specific source with an identification of that source.

6. A method according to claim 1 wherein said digitized images are stored in a mass data image store, and wherein the step of locating includes retrieving into volatile memory a portion of said digitized images, establishing at least one pattern representative of a pattern in the image store which is to be located, and comparing the at least one pattern with the digitized images stored in the volatile memory.

7. A method of data processing comprising storing digitized images of document contents including text in at least one font, establishing in non-volatile memory a font table including code values of alphanumeric characters and symbols and images of characters and symbols in each font used in the document text, each character and symbol in each font being correlated with the code value for the character or symbol, selecting and locating digitized images of selected portions of stored documents to be manipulated by data processing, the step of locating each image including forming a table of word images selected and copied from stored documents for use as search words, displaying the search word images, selecting a search word image which appears in the stored documents from the display of word images, comparing each selected search word image with the stored digitized images until a match is found, and copying the stored image of the document containing the word into volatile memory; and processing the selected digitized images.

8. A method according to claim 7 wherein the step of selecting includes selecting a plurality of images of a search word, each image being in a different one of a plurality of fonts, and wherein the method further includes providing a plurality of data processors for performing comparisons of images, and assigning a different data processor to each font of said plurality of fonts for parallel comparison.

* * * * *